United States Patent [19]

Ikeya

[11] Patent Number: 4,774,501

[45] Date of Patent: Sep. 27, 1988

[54] OPERATOR PANEL FOR A DATA INPUT UNIT

[75] Inventor: Shiro Ikeya, Kawasaki, Japan

[73] Assignee: Nitsuko Limited, Kawasaki, Japan

[21] Appl. No.: 878,534

[22] Filed: Jun. 25, 1986

[51] Int. Cl.⁴ .................................................. G06F 3/02
[52] U.S. Cl. ............................. 340/365 VL; 200/5 A;
200/310; 340/365 R
[58] Field of Search ............ 340/365 R, 365 VL, 712,
340/711, 706, 365 R; 200/5 A, 308, 309, 312,
159 B, 317, 310, 316; 434/339

[56] References Cited

U.S. PATENT DOCUMENTS

| | | | |
|---|---|---|---|
| 3,200,375 | 8/1965 | Lutz | 340/365 VL |
| 4,066,850 | 1/1978 | Heys | 340/365 VL |
| 4,441,001 | 4/1984 | Miyano et al. | 340/365 VL |
| 4,633,227 | 12/1986 | Menn | 340/365 VL |

*Primary Examiner*—John W. Caldwell, Sr.
*Assistant Examiner*—Alvin Oberley
*Attorney, Agent, or Firm*—Armstrong, Nikaido, Marmelstein & Kubovcik

[57] ABSTRACT

An operator panel for a data input unit has a printed circuit board on which key switches corresponding to a number of commodities are arrayed. A flexible sheet is bonded over the keytops of the key switches. Photographs depicting the external appearance and shape of the commodities, or sketches showing the characteristics of the commodities, are printed on the flexible sheet at positions overlying respective ones of the keytops. The sheet has enough flexibility to enable operation of the key switches without hindrance. To input data relating to a desired commodity, an operator finds the photograph or sketch of the commodity on the flexible sheet and presses this portion of the sheet, thereby pressing the underlying commodity key switch to effect the entry of the data.

3 Claims, 5 Drawing Sheets

OPERATOR PANEL FOR A DATA INPUT UNIT

BACKGROUND OF THE INVENTION

This invention relates to a data input unit for use in an information collecting system such as a POS (point-of-sale) system.

FIG. 1 is a block diagram illustrating the configuration of an information collecting system employing a POS system for collecting point-of-sale information. The information collecting system includes a terminal controller 101 connected to a plurality of data input units 102-1, 102-2 . . . 102-n for each of a chain of stores 100. The data input units 102-1, 102-2 . . . 102-n feed data into the terminal controller 101, which delivers these data to transmission adapter 103. The latter in turn transmits the data to a central host computer 300 via a transmission line 200 such as a public telephone line. The computer 300 processes the collected information and creates various data for management control.

In the information collecting system having the above-described configuration, it is necessary that the operators manipulating the data input units 102-1, 102-2 . . . 102-n enter such data as the proceeds of various commodities rapidly and accurately.

In the conventional data input unit, the name of a commodity corresponding to a commodity key used in selling the commodity is indicated on the keytop in the form of characters and the operator enters the pertinent data while viewing the characters on the keytop. However, in order to enter the proceeds and other data using these conventional data input units 102-1, 102-2 . . . 102-n bearing the names on the keytops in character form, there is a limit upon the rapidity of manipulation because the operator is required to search for the characters on the commodity keytops. In addition, since the operator must remember the shapes and names of the commodities, training requires considerable time. Furthermore, owing to the use of characters to represent the names of the commodities on the commodity keys, a considerable period of time is required to educate the operator in using the input unit satisfactorily. This makes it difficult to employ part-time workers such as students as the operators.

SUMMARY OF THE INVENTION

An object of the present invention is to provide a data input unit operator panel which enables an operator to manipulate a data input unit of the above-described type with a major reduction in the time needed for operator education and training.

According to the present invention, the foregoing object is attained by providing a data input unit operator panel having a number of commodity key switches arrayed on a commodity data input section of the operator panel. A sheet having enough flexibility to permit the commodity key switches to be operated without hindrance is bonded over the keytops of the commodity keys. At the position of each commodity key, the sheet has a photograph or sketch depicting the external appearance and shape of the corresponding commodity printed thereon. To input data relating to a desired commodity, an operator finds the photograph or sketch of the commodity on the flexible sheet and presses this portion of the sheet, thereby pressing the underlying commodity key switch to effect the entry of the data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
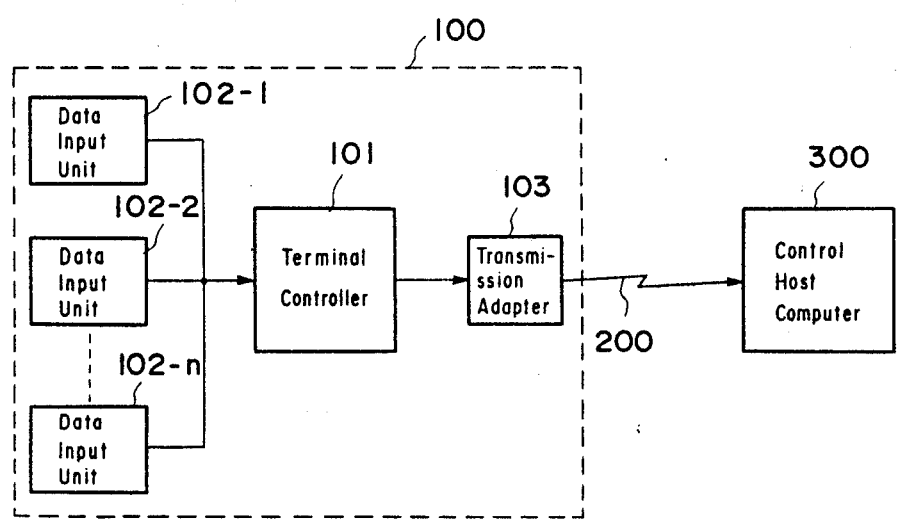
FIG. 1 block diagram illustrating the configuration of an information collecting system employing a POS system.
Figure 2:
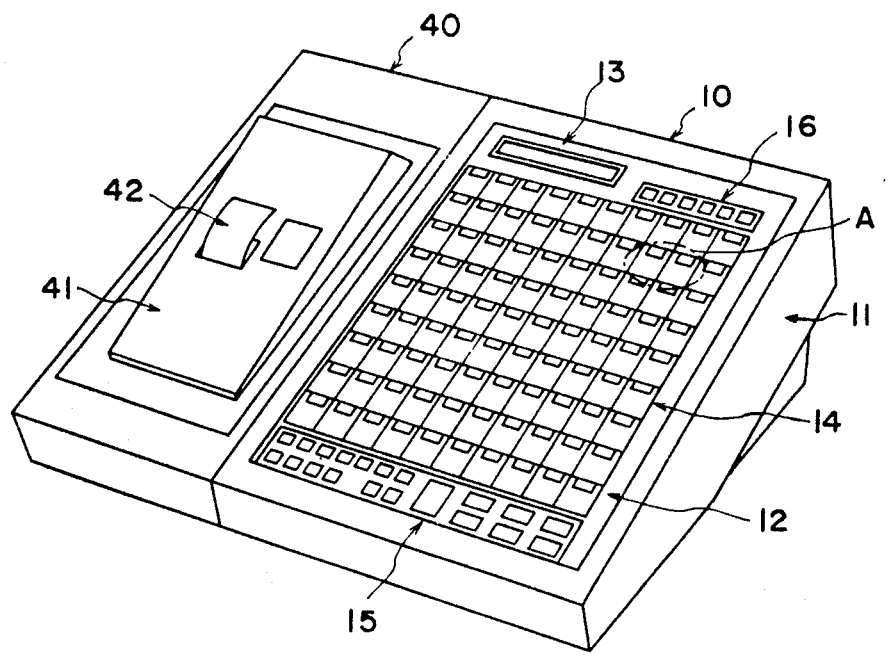
FIG. 2 is a perspective view showing the external appearance of a data input unit according to the present invention.

A data input unit according to the present invention comprises a data input section 10, a printer section 40 and a case 11 accommodating these sections, as shown in FIG. 2. The data input section 10 is provided with an operator panel 12 on the upper portion of the case 11 to permit an operator to input various data, and a display 13 for displaying such information as sum totals, amounts received, change, etc. The operator panel 12 is provided with a commodity data input panel 14 having an array of a number of commodity key switches for inputting various commodity data, and data input panels 15, 16 on which numeric keys and the like are arranged.

The printer section 40 is provided with a printer 41 for printing various data entered at the data input section 10, and for feeding out a strip of paper 42 on which the data have been printed in response to a print command entered at the data input panel 15. A sheet, described below, having the external appearance and shape of commodities printed thereon in photographic form at positions corresponding to the commodity keys is bonded over the keytops of the commodity keys on the commodity data input panel 14. By pressing the position of a photograph of a commodity desired to be entered, the commodity key switch immediately underlying the pressed position is turned on to input the commodity data relating to the particular commodity.

Figure 3:
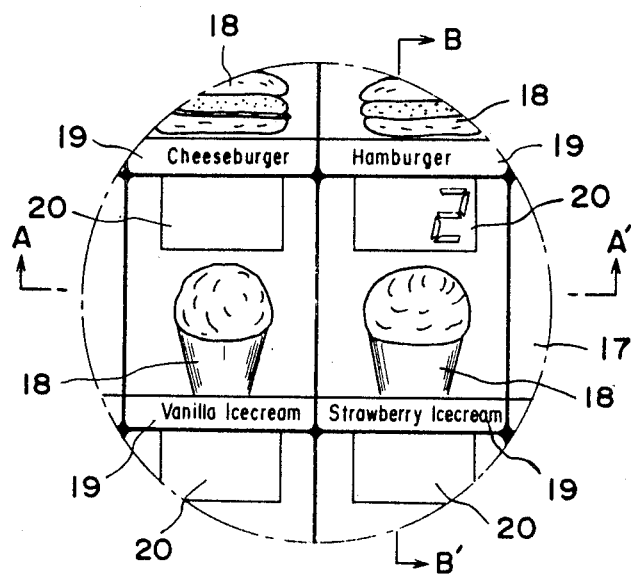
FIG. 3 is an enlarged plan view of a portion A shown in FIG. 2.

FIG. 3 is an enlarged sectional view showing a portion (portion A encircled by the broken line in FIG. 2) of the commodity data input panel 14. A photograph sheet 17 is bonded over the keytops of the commodity key switches and, at positions overlying these keytops, has characters 19 printed thereon indicating the names of the corresponding commodities, such as vanilla ice cream, strawberry ice cream, a cheeseburger, a hamburger and the like. Printed on the photograph sheet 17 at positions above the characters 19 are photographs 18 depicting the external appearance of the corresponding commodities. The sheet 17 is formed to include a transparent portion 20 above each photograph 18 through which the operator is capable of seeing the display of a counter that counts the number of times the corresponding item of commodity data is inputted.

Figure 4:
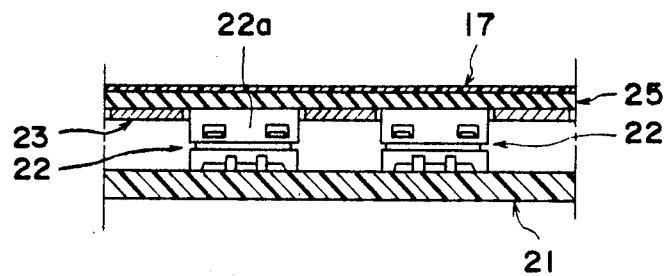
FIG. 4 is a sectional view taken along line A-A' of FIG. 3.
Figure 5:
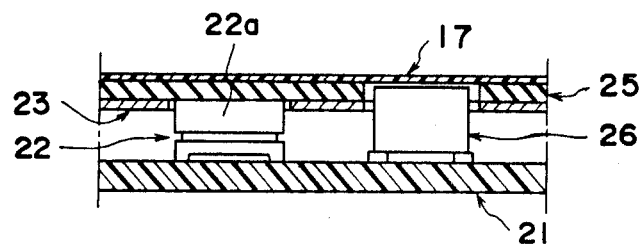
FIG. 5 is a sectional view taken along line B-B' of FIG. 3.

FIGS. 4 and 5 are sectional views taken respectively along lines A-A', B-B' of FIG. 3. Numeral 21 denotes a printed circuit board on which the circuit patterns of the data input unit are printed. Mounted on the printed circuit board 21 are commodity key switches 22 and display units 26 belonging to the aforementioned counters that count the number of times the corresponding key switches 22 are operated, namely the number of times an input of the commodity data is made. A frame 23 is fixed to the printed circuit board 21 leaving a prescribed clearance between itself and the printed circuit board 21. The frame 23 consists of a metal plate formed to include openings shaped, sized and positioned to permit keytops 22a of the commodity key switches 22 and the upper portions of the counter display units 26 to pass therethrough. A rubber sheet 25 is placed on the frame 23 and is formed to include openings at the positions of the counter display units 26 shaped and sized to permit the upper portions of the corresponding display units to pass therethrough. The aforementioned photograph sheet 17 bearing the printed photographs of the appearance of the commodities is placed on the upper surface of the rubber sheet. The photograph sheet 17 is formed of a sheet of resin material flexible enough to allow the commodity key switches 22 to be operated (i.e. enough to allow the keytops 22a to be pressed) without hindrance. The photograph sheet 17 is formed to include the transparent portions 20 at the positions of the counter display units 26 to permit the upper surface of each display unit 26 to be seen through the corresponding transparent portion.

Figure 6:
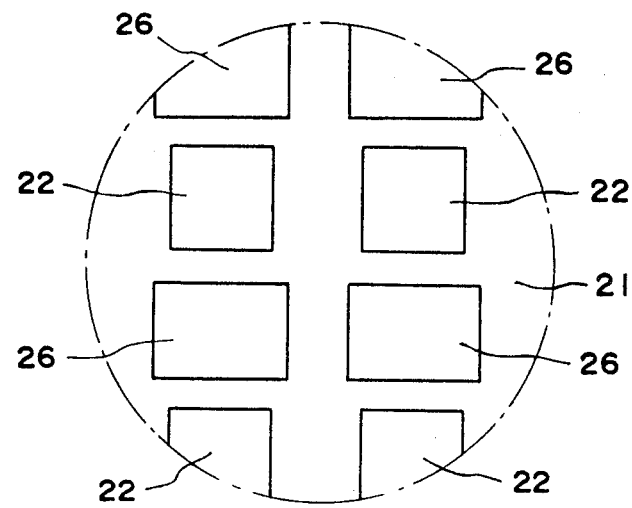
FIG. 6 is a plan view showing the manner in which commodity keys and counter display units are mounted on a printed circuit board at the portion A.

FIG. 6 is a plan view showing the commodity key switches 22 and the counter display units 26 mounted on the printed circuit board 21 and arrayed in a predetermined spaced relation. Though FIG. 6 corresponds to the portion of the commodity data input panel 14 shown at A in FIG. 2, the commodity key switches 22 and counter display units 26 are mounted over the entire upper surface of the printed circuit board 21 in the commodity data input panel 14.

Figure 7:
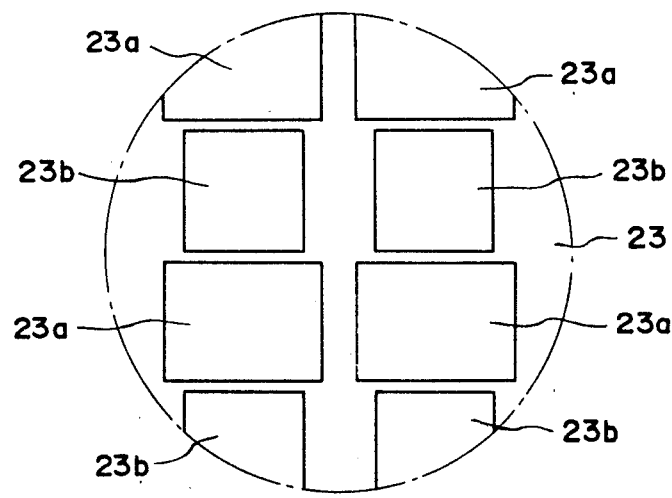
FIG. 7 is a plan view showing a frame at the portion A.

FIG. 7 is a plan view illustrating the shape of the frame 23. The frame 23 is formed to include openings 23a shaped and sized to permit the keytops 22a of the commodity key switches 22 and the upper portions of the counter display units 26 to pass therethrough, and openings 23 for permitting the upper portions of the counter display units 26 to pass therethrough. Though FIG. 7 illustrates the frame 23 at the portion A of commodity data input panel 14 shown in FIG. 2, the frame 23 is similar in form over the entirety of the commodity data input panel 14.

Figure 8:
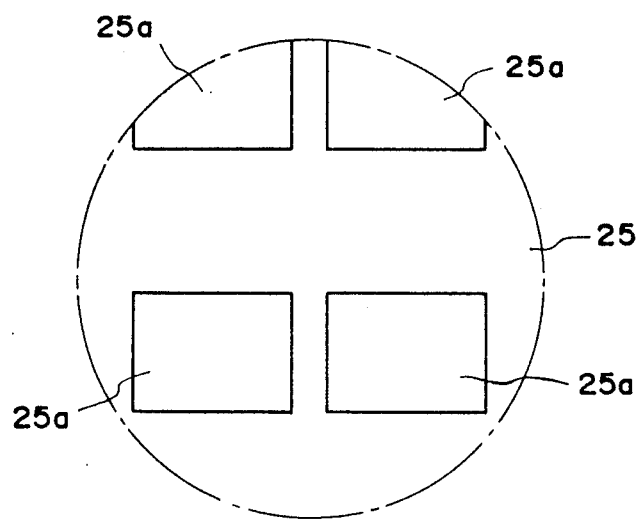
FIG. 8 is a plan view illustrating a rubber sheet at the portion A.

FIG. 8 is a plan view showing the shape of the rubber sheet 25. The latter is formed to include openings 25a shaped and sized to permit the upper portions of the counter display units 26 to pass therethrough. Though FIG. 8 illustrates the rubber sheet 25 at the portion A of the commodity data input panel 14 shown in FIG. 2, the rubber sheet 25 is similar in form over the entirety of the commodity data input panel 14.

Figure 9:
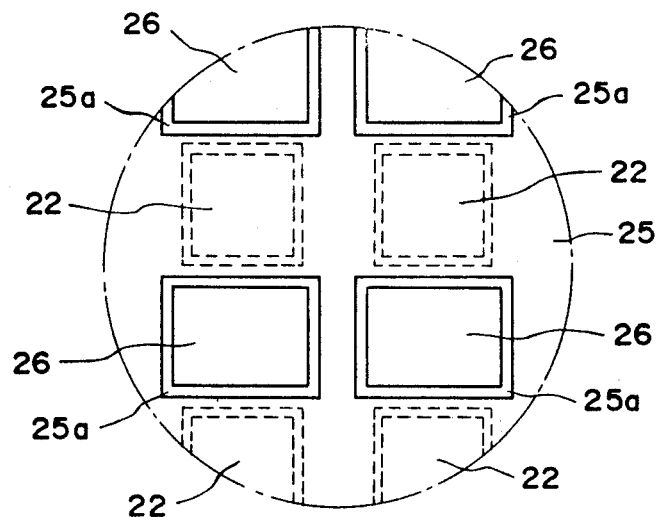
FIG. 9 is a plan view showing a photograph sheet in the peeled-off state at the portion A.
Figure 10:
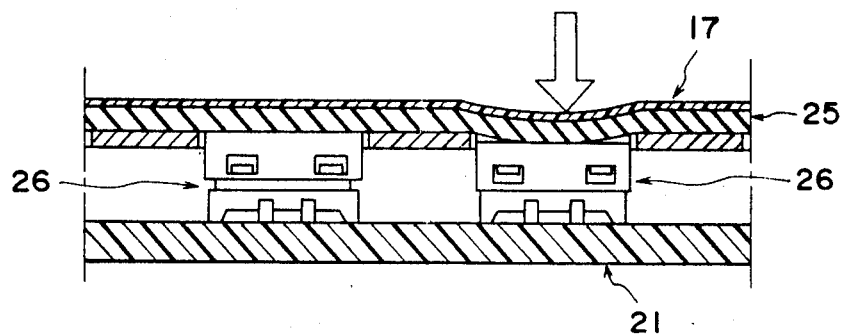
FIG. 10 is a sectional view showing a commodity key in the pressed state at the portion A.

FIG. 9 is a plan view illustrating the commodity data input panel 14 in a state devoid of the photograph sheet 17. It will be appreciated that the counter display units 26 are exposed at the openings 25a formed in the rubber sheet 25, and that the commodity key switches 22 are covered by the rubber sheet 25. Though FIG. 9 illustrates the data input panel 14 devoid of the photograph sheet 17 at the portion A shown in FIG. 2, the entirety of the commodity data input panel 14 is similar in form.

In the operator panel 12 having the abovedescribed construction, the operator presses a portion of the photograph sheet 17 on which the photograph of a commodity is printed. Owing to the operator's finger pressure, the photograph sheet 17 and rubber sheet 25 are flexed downwardly, as shown in FIG. 9, as a result of which the keytop 22 of the commodity key switch 22 for inputting the corresponding commodity data is depressed. This turns the commodity key switch 22 on to input the commodity data. Assume that a customer at the store wishes to purchase three of the same commodity. Whenever the operator presses the position at which the photograph of the commodity is located, the numeral shown on the corresponding counter display unit 26 is incremented by 1. Accordingly, the operator can visually confirm the number shown on the display unit and stop pressing the key switch when the displayed numeral becomes "3". Three items of the commodity data will thus be entered.

It should be noted that the circuitry of the data input section 10 and printer section 40 may be the same as in the prior art and do not have a direct bearing on the present invention. A description thereof is deleted.

In the illustrated embodiment, use is made of the photograph sheet 17 on which photographs of the external appearance of the commodities are printed. However, the invention is not limited to the use of photographs, for it goes without saying that pictures such as sketches depicting the characteristics of the commodities can be printed on the sheet.

Further, it has been described that the rubber sheet 25 is placed upon the frame 23. However, the rubber sheet 25 is not absolutely essential, for the photograph sheet 17 may be placed directly on the frame 23.

Also, the rubber sheet 25 can be replaced by a resin sheet or the like as long as it has enough flexibility to enable operation of the commodity switches 22 without hindrance.

As many apparently widely different embodiments of the present invention can be made without departing from the spirit and scope thereof, it is to be understood that the invention is not limited to the specific embodiments thereof except as defined in the appended claims.

What we claim is:

1. An operator panel for a data input unit comprising:
a printed circuit board;
a plurality of key switches arrayed on said printed circuit board and being a pushbutton type switch, said switch having a vertically movable keytop and a stationary lower member;
a plurality of counter display units placed upon said printed circuit board and each positioned adjacent to one of said plurality of key switches;
a frame including a plurality of openings at the positions of said keytops and said display units, each opening being shaped and sized to permit each keytop and display unit to pass therethrough;
a first flexible sheet placed upon said frame and having a plurality of openings at the positions of said display units; and a second flexible sheet disposed on said first flexible sheet, said second flexible sheet being provided with external appearances of desirable commodities at the positions above said keytops and also having a plurality of transparent portions directly above said openings.

2. An operator panel according to claim 1, wherein said external appearances are sketches of the commodites.

3. An operator panel according to claim 1, wherein each external appearance is provided with name of each commodities.

* * * * *